Dec. 29, 1942. S. N. BOBO 2,306,519
BROILER-ROASTER
Filed Sept. 12, 1940 2 Sheets-Sheet 1

INVENTOR
Stephen N. Bobo
BY
HIS ATTORNEY

Dec. 29, 1942.  S. N. BOBO  2,306,519
BROILER-ROASTER
Filed Sept. 12, 1940  2 Sheets-Sheet 2
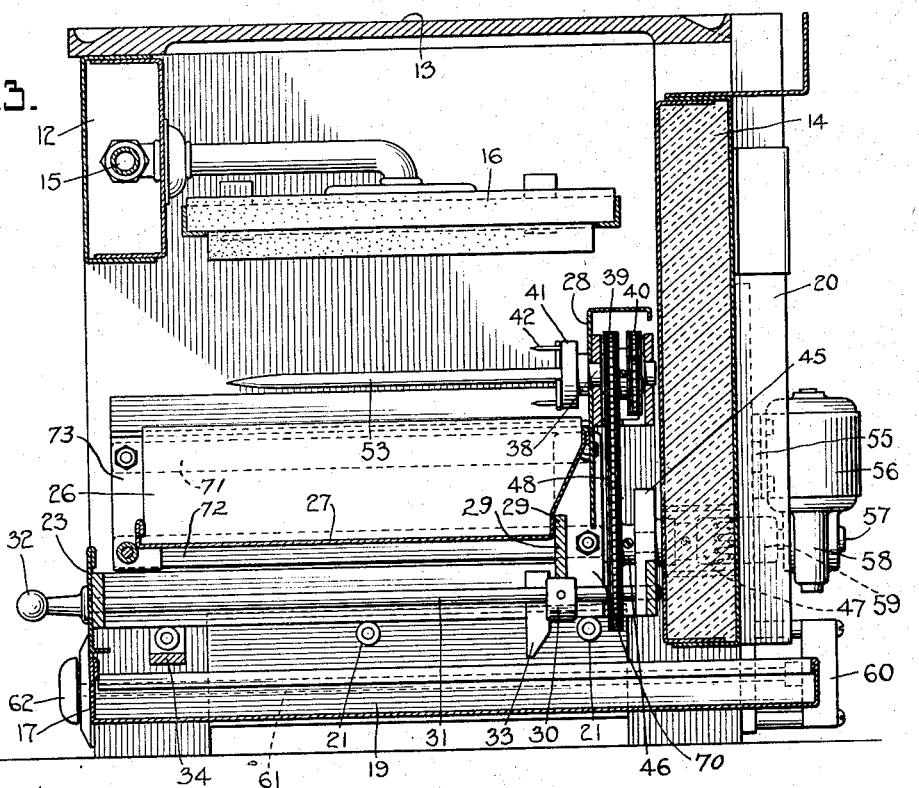
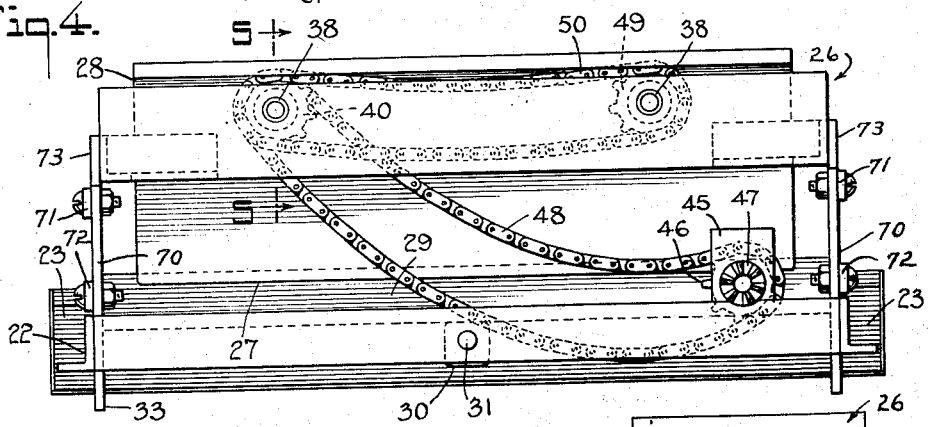
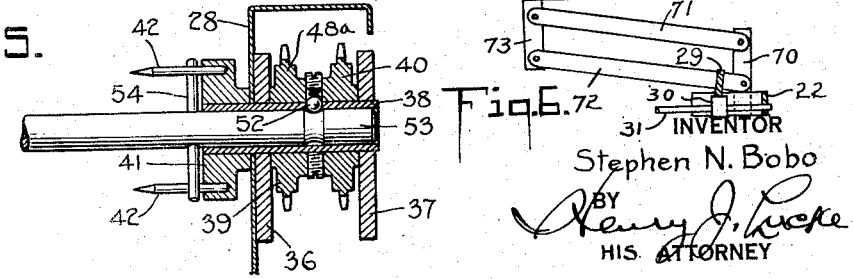
INVENTOR
Stephen N. Bobo
BY
HIS ATTORNEY Patented Dec. 29, 1942

2,306,519

UNITED STATES PATENT OFFICE 2,306,519

BROILER-ROASTER

Stephen N. Bobo, New York, N. Y.

Application September 12, 1940, Serial No. 356,415

3 Claims. (Cl. 126—41)

My present invention relates to cooking devices, and more particularly to an improved broiling and roasting device.

In my co-pending application Serial No. 315,472, filed January 25, 1940, and entitled Adjustable broiler grate holding rack, I have described and claimed an improved adjustable broiler grate holding rack for use in broiling food, said rack being mounted in a casing and adjustable toward and from a stationary broiler unit wherein the heat is radiated downward onto the food.

In such device the food is adapted to be placed on a grid or grill and moved into position adjacent the radiant heater, but during the broiling operation the food is held relatively stationary.

I have found that the radiant broiling apparatus above referred to as being included in my co-pending application Serial No. 315,472 is of special advantage in the broiling or baking of food, particularly flesh meats as beef, lamb, chicken and the like and utilize in connection therewith the same type of enclosure described in my above referred to co-pending application.

In utilizing such container I dispense with the food holding grill and the mechanism for operating the same so as to bring the food contained on the grill into and out of operative engagement with the radiant heater, and associate with such container a spit or spits upon which the meat to be broiled or baked is secured or mounted. Associated with this mechanism is means for rotating the spit or spits at a predetermined rate of speed, while it is within the purview of my invention to arrange the spit or spits so as to be movable at the same time toward or from the radiant element, thus permitting the user to regulate the amount of heat to be received by the meat to be roasted or baked.

I provide means for constantly rotating the spit or spits and by proper resistance may control the speed of rotation to anything that may be desirable or necessary.

An object of my invention is to provide an improved roasting or baking device.

Another object of my invention is to provide an improved roasting device of the spit type.

Other objects and novel features of the construction and arrangement of parts comprising the device will appear as the description of the invention progresses.

In the accompanying drawings:

Fig. 3 is a sectional side elevation of the device shown in Figs. 1 or 2, and illustrating the driving mechanism for one of the spits.

Fig. 4 is a rear elevation of the movable structure of the device illustrated in Fig. 3.

Fig. 5 is a sectional elevation on the line 5—5 of Fig. 4.

Fig. 6 is a schematic drawing of one side of the parallel motion mechanism by means of which the spit-holding frame may be raised or lowered.

Figure 1:
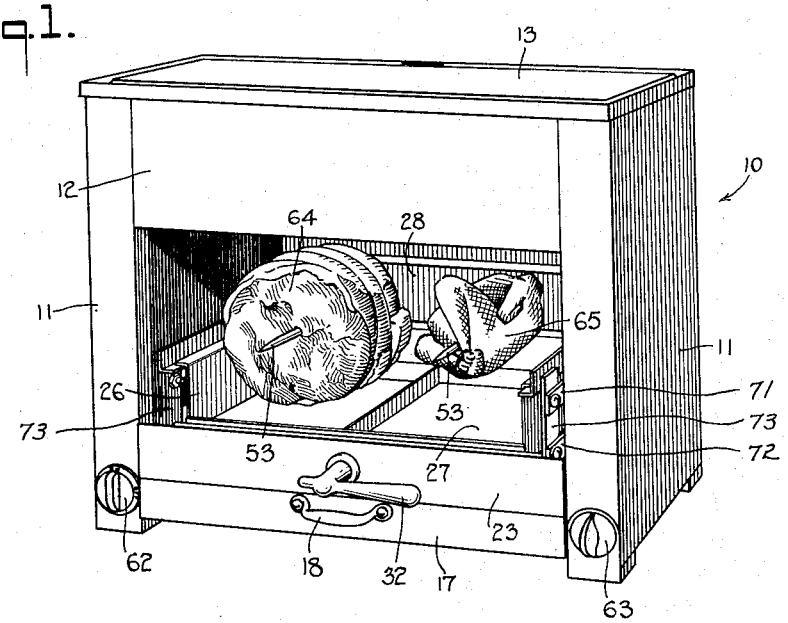
Fig. 1 is a perspective view of a device embodying my invention and showing the same in operation.

Referring to the drawings, 10 denotes generally a casing comprised of sides 11, front element 12, top 13, and back 14. Preferably, the sides and back are insulated in the manner illustrated with respect to the rear element in Fig. 3, but the top 13 is not insulated, being preferably of metal and may be utilized as an element for frying, and the like. Also, the front 12 is not insulated, such not being considered necessary as such front is hollow and acts as a housing for the conduit 15 for conveying the gas from a source of supply to a radiant burner 16 which is located in the device between the front and back walls 12 and 14 respectively and immediately below the top 13.

At the lower portion of the device is a front 17 slidably mounted in the device and movable by means of the handle 18, and secured to the front 17 is a pan 19 for collecting unconsumed products of combustion which condense and move downwardly, as through a conduit 20.

Slidably mounted in the device on rollers 21 on the side or end walls 11 is a framework 22, provided with a front wall 23. Vertically movable in the framework 22 is a spit-holding framework 26, the lower portion of which is formed as a drip pan 27 and in the rear wall 28 of which are rotatably mounted the spit driving elements to be hereinafter described in detail.

The framework 26 includes the following elements and operates in the following manner. Forming part of the framework 22 are plates 70, there being one such plate at each side of the framework. Pivotally mounted on each of the plates 70, adjacent the top end is a link 71, while pivotally mounted on each of the side plates 70 adjacent the lower end is a link 72. The links 71 and 72 are pivotally connected at their outer ends by links 73. The proportion of the links 71 and 72 and the links 73 is such that the upper edge or surface of the link 71, for example, is substantially horizontal when the device is in its normal position, as shown for example in Fig. 3. Secured to the pivot point of the link 73 and link 71 is the framework 26, above referred to, and such framework is not only held in a horizontal position as shown in Fig. 3, but will remain in a horizontal position regardless of the degree of rotary movement of the lever 71 about the pivot of the same on the plate 70. The links 71 and 72 and the links 73 constitute a parallel motion device of the well-known type. Secured to and extending between links 72, adjacent the pivot connection of such links with the member 70, is the cam plate 29. This cam plate 29 is adapted to be engaged by a cam 30 secured to a cam shaft 31 rotatably mounted in the framework 22, and adapted to be rotated by the handle 32 located on the front 23 of the frame 22. Also secured to the framework 22 at each side thereof are lugs 33 adapted to engage with a stop 34 secured to the side members 11 adjacent the front thereof to prevent too far outward movement of the framework 22 when the same is moved from the position shown in Fig. 1, to the position shown in Fig. 2.

Mounted on and spaced apart from each other on the back wall 28 of the frame 26 are plates 36 and 37. Bearings are formed in the plates 36 and 37, and rotatably mounted in each of said bearings are the hollow shafts 38 (see Fig. 5). Between the plates 36 and 37 and at one end thereof is secured to the hollow shaft 38 sprocket wheels 39 and 40, respectively, and suitably spaced therefrom is mounted a sprocket wheel 49. In front of the rear wall 28 and secured to the hollow shaft 38 is a member or face plate 41 carrying a plurality of outwardly projecting pins 42, the axes of such pins lying parallel to the axis of the hollow shaft 38, all as clearly shown in Fig. 5. Secured to the rear wall 14 is a bearing member 45 and rotatably mounted in such bearing member is a shaft having secured at one end a sprocket wheel 46 and at the other end a clutch member 47. The sprocket wheel 46 is in alignment with the sprocket wheel 39 mounted on one of the hollow shafts 38 and above referred to. Over the sprocket wheels 39 and 46 runs a sprocket chain 48. The sprocket wheel 40 is in alignment with the similar sprocket wheel 49 above referred to and in substantially the same horizontal plane as such sprocket wheel 40. Over these sprocket wheels runs the sprocket chain 50 and rotation of gear 46 is, therefore, effective to rotate gears 40 and 49.

Associated with the sprocket wheel 49 is a face plate arrangement similar to the face plate 41; said face plate similarly carries projecting pins. Each of the hollow shafts 38 is provided with a spring pressed ball clutch member 52 for releasably holding a member, such as a shaft 53, against accidental removal, while permitting intentional removal therefrom. The shaft 53 constitutes a spit, the other end of which is pointed, and said shaft is provided with a cross pin 54 for engaging with one or more of the pins 42 on the face plate 41 so that the rotary movement of the face plate 41 results in rotary movement of the spit 53.

Secured to the rear wall 14 is a bracket 55 on which is mounted a driving member 56 which drives a shaft 57 through any convenient form of reduction gear 58, and associated with the shaft 57 is a member 59 which cooperates with the clutch member 47 carried by the bearing 45 on the sub-frame 22.

Figure 2:
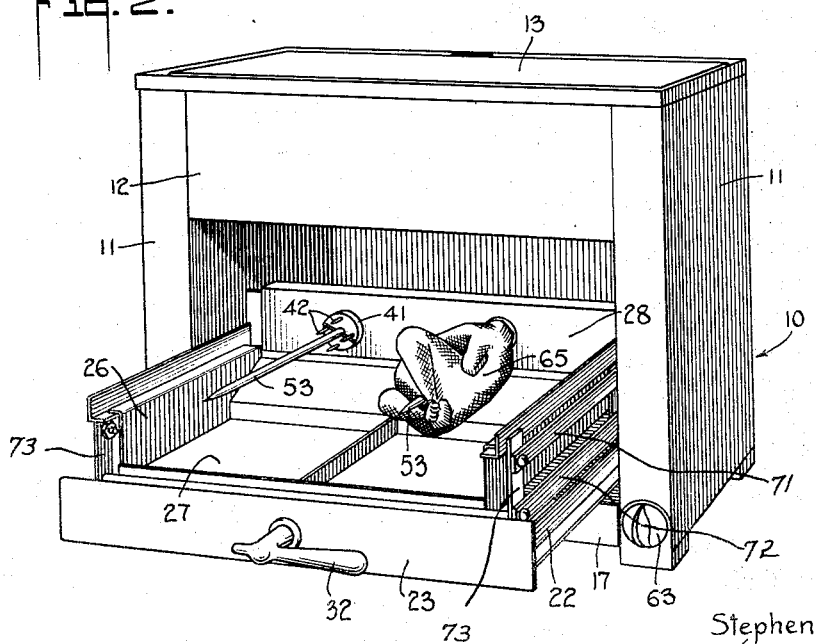
Fig. 2 is a perspective view similar to Fig. 1, but illustrating the meat holding devices in outward position and out of engagement with the driving mechanism.

If the handle 32 is utilized as a means for withdrawing the frame 22 and parts carried thereby from the position shown in Fig. 1 or Fig. 3, to that shown in Fig. 2, the clutch member 47 shown in Fig. 4 will be withdrawn from connection with the clutch member 59. Upon reversal of this operation the clutch members 47 and 59 are again brought into engagement with each other. As a convenient means for operating the motor 56 I provide a switch 60 operated by shaft 61 by a switch handle 62 mounted on the edge face of one of the side or end frame members 11. In Fig. 1 I have designated another element by the reference numeral 63, and this element is utilized ordinarily for controlling the gas supplied to the radiant element 16.

In operation the spits 53 may have the meat, as the roast of beef 64, or the chicken 65, attached thereto at any convenient place and the spit elements 53 are then moved into the hollow shafts 38 and are held against accidental movement by the clutch member 52. Gas is turned on in the radiant element 16, switch 62 is moved to start the motor 56 and the spit or spits 53 rotate at any desired speed in accordance with the speed reduction mechanism 58. By means of the handle 32 the meat 64 or 65 may be brought closer to or further from the radiant heat element 16 and thus the speed of roasting or baking may be controlled. After the cooking operation the spit 53 with the meat thereon is removed from the structure in the usual way.

Whereas I have described my invention by reference to specific forms thereof, it will be understood that many changes and modifications may be made without departing from the spirit of the invention.

I claim:

1. In an improved broiling and baking device, the combination of a casing defining an oven chamber, a source of radiant heat mounted within the chamber and adjacent the top thereof, a movable framework mounted within the chamber and below the source of radiant heat, a rotatably mounted spit carried by said movable framework and lying below and parallel with the source of radiant heat, and adapted to carry food to be broiled or baked, means for moving the framework toward and away from the source of radiant heat to thereby regulate the distance of the food to be broiled or baked toward or from the source of radiant heat, and power means located externally of the casing for rotating said spit.

2. An improved broiling and baking device according to claim 1, wherein the means for rotating the spit include a driving gear detachably associated with the externally located power means, a driven gear operatively associated with the spit, and means for transmitting power from the driving gear to the driven gear at all stages of movement of said framework.

3. In an improved broiling and baking device, the combination of a casing defining an oven chamber, a source of heat mounted within the chamber adjacent the top thereof, a framework mounted within the chamber and below the source of heat, means for moving said frame toward or away from said heat source in parallelism therewith, a spit carrying means mounted on said framework, said means including a hollow shaft having a plate secured thereto for rotation therewith, said plate having a plurality of pins extending forwardly thereof into the chamber, a gear secured to said hollow shaft for connection with a source of driving power, and a spit having an end insertable into said hollow shaft and a transverse pin engageable with said first-named pins for rotation of the spit upon rotation of said hollow shaft, the food to be cooked being mounted on said spit and impaled upon said first-named pins.

STEPHEN N. BOBO.